April 3, 1928.  T. JENSEN  1,664,562

AUTOMOTIVE DRIVE

Filed Feb. 8, 1926  4 Sheets-Sheet 1

April 3, 1928.

T. JENSEN

AUTOMOTIVE DRIVE

Filed Feb. 8, 1926

Thorwald Jensen, Inventor.
Delos G. Haynes, Attorney.

April 3, 1928.  T. JENSEN  1,664,562
AUTOMOTIVE DRIVE
Filed Feb. 8, 1926    4 Sheets-Sheet 3
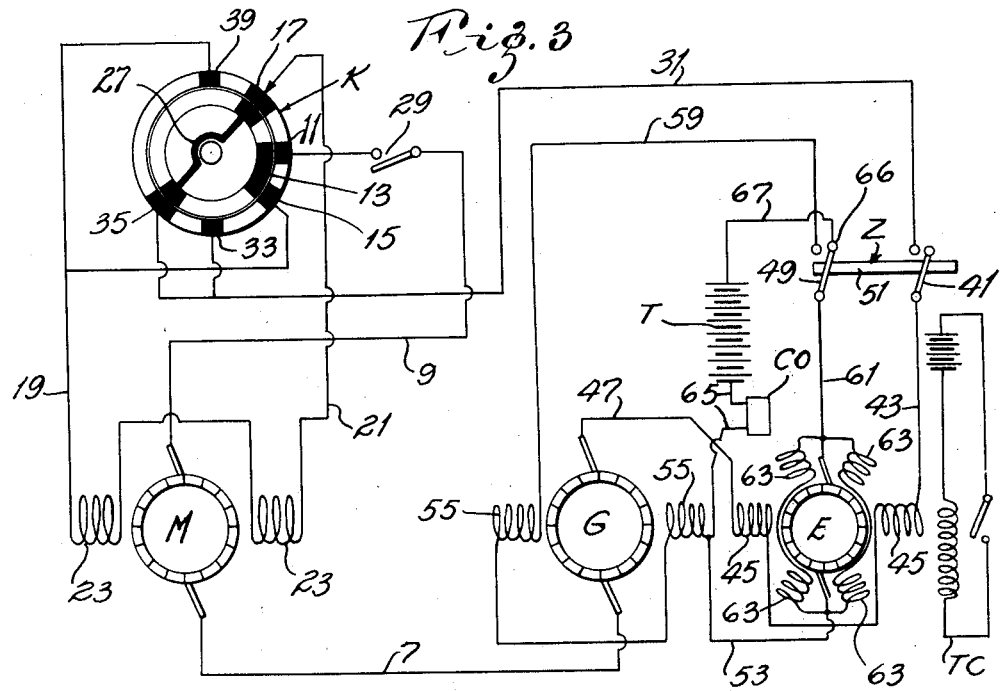
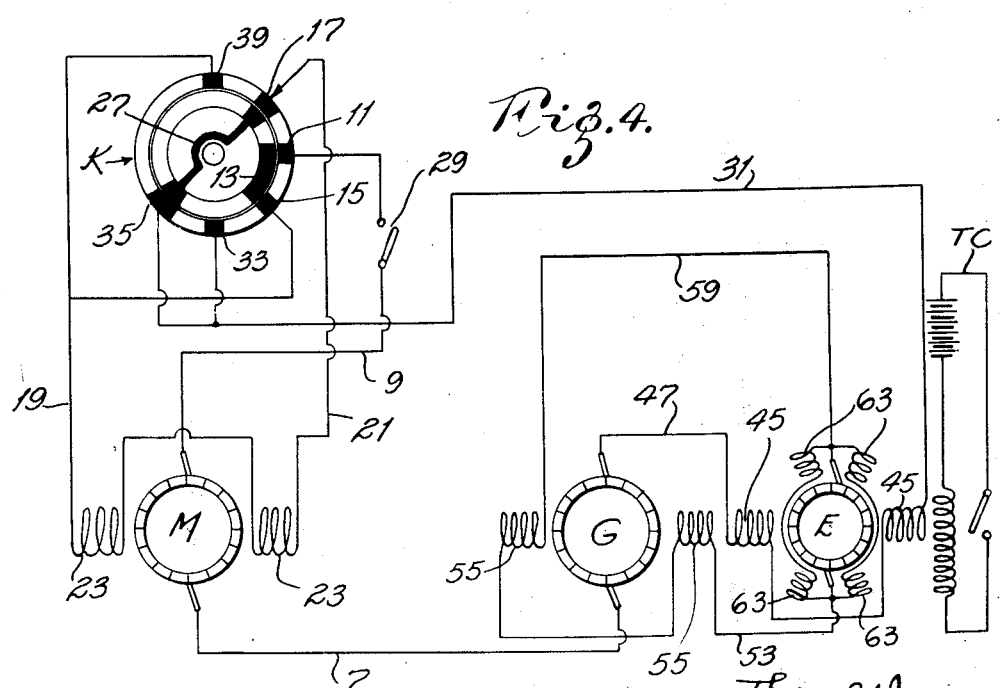

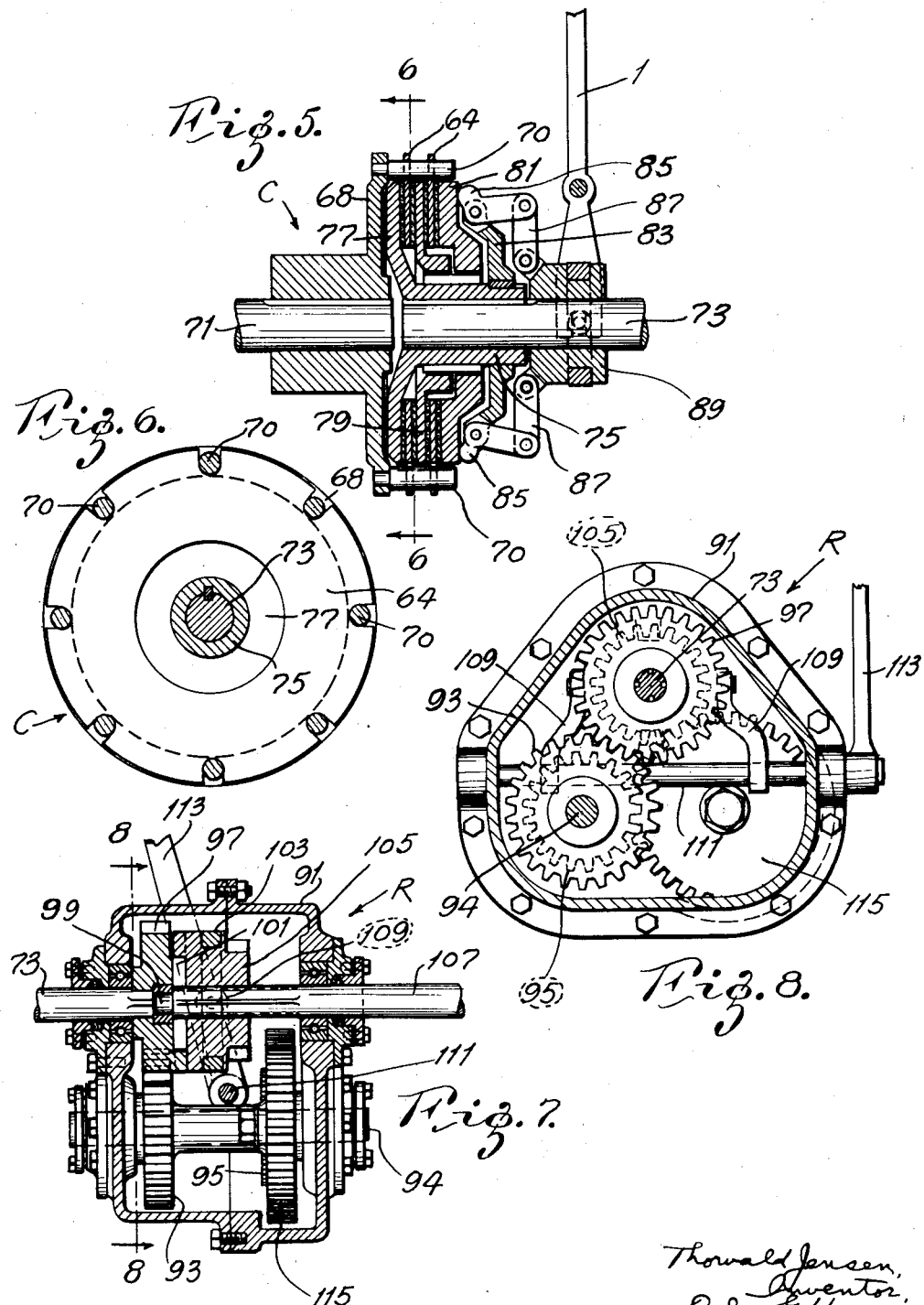

Patented Apr. 3, 1928.

1,664,562

UNITED STATES PATENT OFFICE.

THORVALD JENSEN, OF ST. LOUIS, MISSOURI, ASSIGNOR TO THE WINTHER COMPANY, OF WILMINGTON, DELAWARE, A CORPORATION OF DELAWARE.

AUTOMOTIVE DRIVE.

Application filed February 8, 1926. Serial No. 86,793.

This invention relates to automotive vehicles and with regard to certain more specific features to automotive vehicle driving transmissions.

Among the several objects of the invention may be noted the provision of a driving transmission which combines the ideal torque changing characteristics of an electric drive at low speeds with the inherent economies of a mechanical drive at higher speeds; the provision of a transmission system of the type described which, if desired, is adapted to inherently throw the electrical system into a predetermined condition of current circulation when the mechanical drive is used; the provision of a drive such as described which requires no switch gear to cause the described predetermined current circulating condition; the provision of a device of the type described which may be operated without said inherent current circulating characteristics by employing proper switch gear; the provision of a device of the type described which is characterized by being operable in reverse as well as forwardly and the provision of a drive of the class described which is simple and rugged in construction. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated two of various possible embodiments of the invention, Fig. 1 is a diagrammatic view of a vehicle showing electrical reversing means;

Fig. 3 is a detailed wiring diagram showing certain internal wiring features not shown in Fig. 1 but applying thereto;

Fig. 4 is a detailed wiring diagram showing certain internal wiring features not shown in Fig. 2 but applying thereto;

Fig. 5 is a diagrammatic longitudinal section of a clutch and an operating mechanism therefor;

Fig. 6 is a vertical section taken on line 6—6 of Fig. 5;

Fig. 7 is a longitudinal section of a reversing gear box; and

Fig. 8 is a vertical section taken on line 8—8 of Fig. 7.

Similar reference characters indicate corresponding parts throughout the several views of the drawings.

Figure 1:
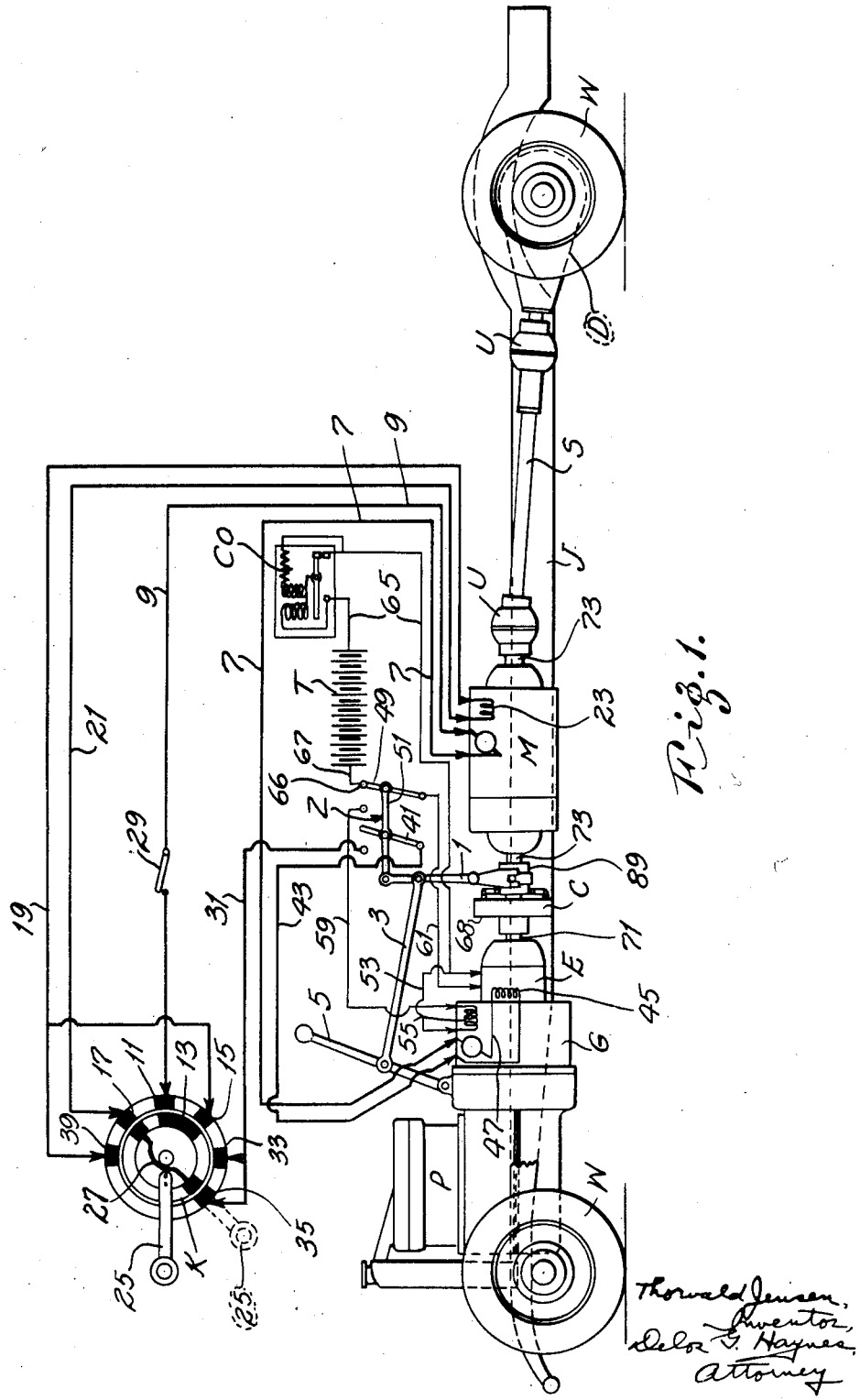

Referring now more particularly to Fig. 1, there is illustrated at J a conventional chassis mounted on wheels W and carrying thereon a prime mover P. The chassis is adapted to receive a conventional body (not shown) for carrying passengers, commodities and the like.

The prime mover P comprises an internal combustion engine or other type which, like the internal combustion engine, will not deliver high torques at low speeds, that is, an engine requiring a change in mechanical advantage from starting to running conditions of the vehicle. Today, this internal combustion engine represents engines of the above named class, and it is the internal combustion engine which has been found exceedingly suitable for driving vehicles, that is, from a standpoint of economies obtainable therefrom.

However, the internal combustion engine is open to the disadvantage that change gears are required to make its torque effective at lower speeds. Hence, both road and rail vehicles employing such engines, at present require a cumbersome gear shifting operation at each start or period of acceleration from rest.

To overcome the objection to shifting gears, with the consequent uneven acceleration, the electric transmission has been employed between the engine and driving wheels. This has been found to give exceedingly smooth and fast acceleration while permitting the internal combustion engine to operate at its most economical speed range as regards fuel consumption. The said economical speed range for gasoline engines has rather narrow limits within which operation must be maintained for best economies at the engine.

On the other hand, the introduction of the electric drive between the internal combustion engine and the driving wheels has led to enormous losses caused by the electric system itself. The result is that the advantages obtained by omitting the usual gear shifting means are entirely offset by the electrical losses. For instance, the motors of the ordinary electric drive, connected to the driving wheels, will run approximately 70 to 75% of the speed of the generator, the generator being direct connected to the driving engine. The actual loss between the engine fly wheel and output end of the driving motor is approximately 25 to 30%.

This loss, it is evident, is about proportional to the speed drop between the generator and the motors. It is also evident that in a direct mechanical drive from the engine P to the driving wheels, that this loss is entirely eliminated, and since the efficiency of gears and gear systems are relatively high it is very desirable to make use of a direct or mechanical drive in some way, if possible. In the present invention both the electric and direct mechanical drive are used to their best advantage, and at periods when their full advantages are most easily obtained.

Referring again to Fig. 1, it will be seen that the generator G is direct connected to the prime mover P. The generator G has formed therewith an exciter E serving to energize the fields of the generator. The armatures of the generator and exciter are preferably wound on a common quill, though not necessarily so. It is evident in the figure that the generator and exciter are mounted on the chassis J as is the engine P. Mounted on said chassis J is a driving motor M which is coupled to the generator unit G by way of a plate clutch C. This clutch C, as will later be made clear, is adapted to be opened and closed. The motor M serves to drive the vehicle through a conventional propellor shaft S, universal joints U, differential housing D, and said rear wheels W.

Broadly speaking, the present invention contemplates the following mode of operation:

The prime mover P is to drive the generator unit G directly. By this means current is supplied to the driving motor M. The clutch C is to remain open or in disconnected position at low speeds, that is, at starting speeds. The clutch C may be manually opened and kept open as described.

Under these conditions, the motor M, being fed current from the generator G, serves to drive the vehicle by way of the mechanical system above outlined.

Figure 2:
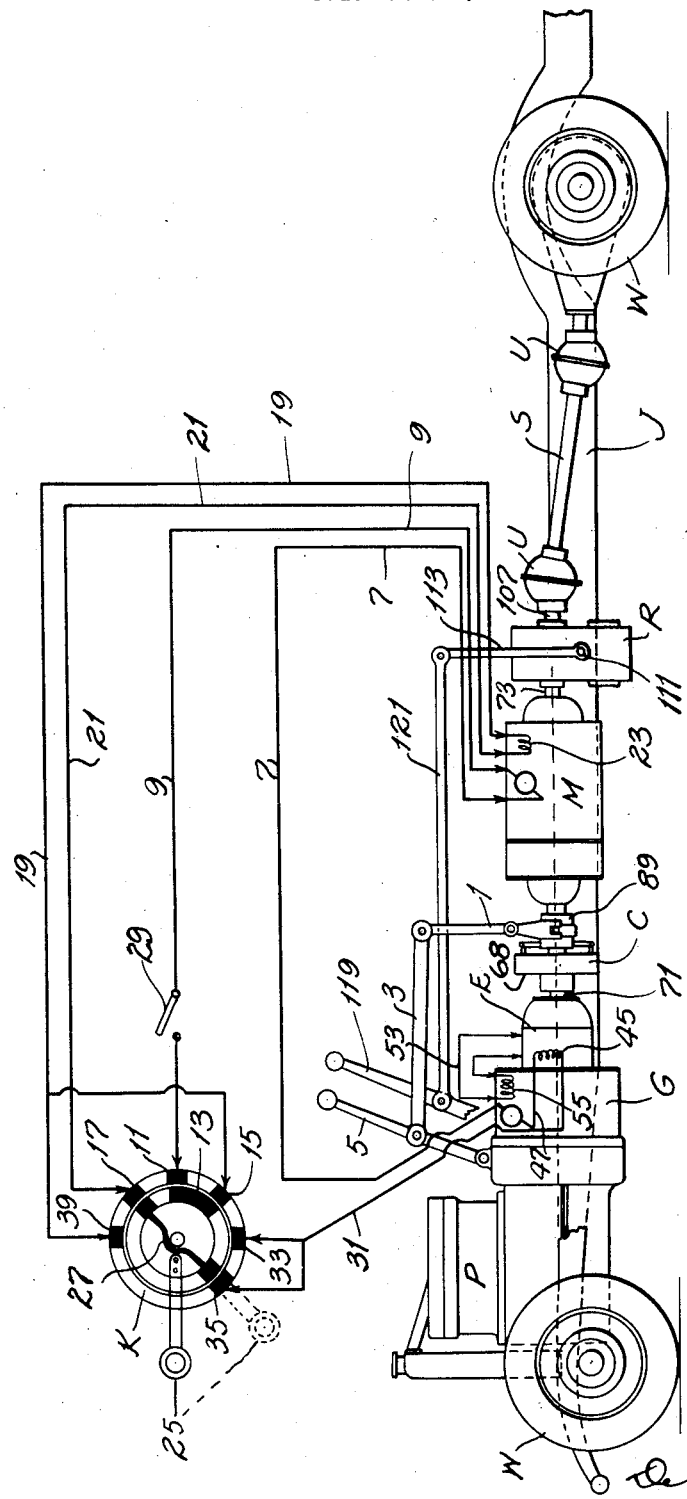
Fig. 2 is a diagrammatic view similar to Fig. 1 showing mechanical reversing means.

In Fig. 2 is illustrated a modified system wherein a reversing gear box R is interposed between the motor M and the propeller shaft S. The purpose of the modification will hereinafter be made clear.

From the above it may be seen that for low speed or starting conditions, a straight electric drive is had, with all the advantages of quick and smooth acceleration accruing thereto. Of course the electric drive, for the short period of acceleration, is operating in its inherently uneconomical manner. The period of acceleration however is usually of short duration. In order to overcome the waste attending the electrical system at higher speeds, which speeds are usually maintained for relatively long periods, the clutch C is closed at said relatively high speeds. The closing operation of the clutch is accomplished manually as was the case with the opening operation. By closing the clutch C it is evident that the prime mover P is put into direct mechanical connection with the driving wheels of the vehicle. This mode of operation has several advantages. One advantage is the fact that the economies are increased over the longer periods of relatively high speed operation, and another is that the clutch C may be designed on a smaller scale.

This last advantage with regard to size of the clutch comes about because the size of a clutch increases (for a given horsepower) directly as the clutch speed decreases, that is, the speed at which the clutch is required to accelerate the car. The clutch C in the present case is not required to accelerate at as great a rate as one operating from a standstill, and in the second place is operating at a higher speed when it goes into play. These factors tend to decrease the size of the clutch parts. Of course with the present invention, previous clutch sizes designed for acceleration from a standstill, may be maintained if desired, whence increased safety is had.

Referring again to Fig. 1, there is shown pivotally a link 1 for operating the conventional clutch yoke. This link 1 is pivoted to a drag link 3 which connects with an operating lever 5, located preferably in the vehicle cab or at the operating seat. By this means the clutch yoke may be operated from the lever 5 and hence the clutch C is under full manual control of the driver. To operate the car he starts the engine P, and to accelerate he merely closes the proper switches to feed current from the generator G to the motor M. The vehicle then runs as a straight electric drive until such speed is reached as the operator judges is correct for connecting or closing the clutch C. He then closes the clutch C by means of lever 5 and from then on the vehicle operates on a straight mechanically connected drive.

It is evident that when the vehicle operates on direct drive from engine P, as above described, that the generator G and motor M (the clutch closed) will be rotating at the same speed. This will cause the motor M, if it is of the same rating as generator G, to generate a counter electro-motive-force which is equal to the output of the generator G. The two units G and M are then in potential balance and no electrical losses occur between them. This is because no current flows. It is evident, as above stated, that the electrical losses between two machines such as G and M are about proportional to the speed drop between them, and hence the losses are zero when the machines run at the same speed.

If desired, the motor M may be designed with a slightly lower rating than that of the generator G. Hence, when the clutch is closed the generator will have a slightly higher potential than the counter electro-motive-force of the motor M. By this means a slight flow of current may be maintained to prevent the brushes of the apparatus from glazing. This slight flow of current will not retard the driving but will help it. The amount of current flowing however, is not enough to involve appreciable electrical losses.

The electrical circuits used in connection with the present embodiment of the invention are shown in Figs. 1, 2, 3 and 4. The internal connections in and between the generator G and the exciter E are omitted in Figs. 1 and 2.

Referring now to Figs. 1 and 3 there is illustrated a connecting line 7 joining the generator G and the motor M. This line 7 joins two of the brushes of the two machines. The remaining brush of the motor is connected to a terminal block 11 of a reversing controller K. The block 11 is adapted, by a movable block 13, to be put into electrical connection with either a block 15 or a block 17, whereby electrical connection is made either with a line 19 or a line 21. The lines 19 and 21 lead to opposite terminals of the motor fields 23, whereby the polarity of said fields may be reversed for reversing rotation of the motor M, that is by moving the connector block 13. The block 13 is mounted on a rotor which is manually movable from a handle 25, to the alternate dotted line position shown. The said rotor has fastened thereto a second connector block 27 for purposes to be made clear. It is evident that the line 9 is a feeder to the controller K and feeds current to line 19 in one position of the rotor, and to line 21 in the alternate position of said rotor. A manually operable switch 29 is put into the line 9 for breaking the load current at will.

As stated, the line 9 is an ingoing line for the controller K. The outgoing line therefrom is the line 31. It connects with two blocks 33 and 35 of the controller K. The blocks 33 and 35 are adapted to be connected alternatively to blocks 17 and 39 by means of said connector block 27. The blocks 17 and 39 connect with said lines 21 and 19 respectively.

From the above it may be seen that with the controller K, in the solid line position shown in Figs. 1 and 3, that current takes the following path from line 9; namely, blocks 11, 13, 15, wire 19, fields 23, line 21, blocks 17, 27, 35 to the outgoing line 31.

When the controller is set to its reverse dotted line position indicated in Fig. 1, then the current flows from line 9 to blocks 11, 13, 17, line 21, through the fields 23 in a reverse direction, line 19 to blocks 39, 27, 33, and again to wire 31. Thus the motor may be reversed in motion. The switch 29 serves merely to break the whole motor circuit.

The wire 31 leads to a terminal of a pole 41 of an interlocking manually operable switch Z. The other terminal of said pole 41 is provided with a lead wire 43 passing to the fields 45 of the exciter E. The other end of the exciter field circuit is connected with a brush of the generator G by a wire 47. The main load circuit has now been traced.

The lever 1 is adapted to open the clutch C by manual operation from the lever 5. The lever 1 is pivotally connected with poles 41 and 49 of said switch Z by a link 51, whereby the switch poles may be opened when the clutch is closed. It is then evident that the load circuit between the generator G and motor M is broken when the clutch is closed for mechanical driving, regardless of the fact that the switch 29 may be closed.

Referring now to the exciter output circuits for the generator fields, there is indicated an output line 53 from the exciter E into which is connected the pair of generator fields 55. The other end of the fields 55 is connected to the terminal of the pole 49 by a line 59. The other terminal of said pole 49 is connected with a brush of the exciter E by a line 61, while the other brush of said exciter connects with the said generator fields as described. Connected in parallel across the said brushes of the exciter E are the exciter main fields 63. The series fields 45 of said exciter E which carry load current are preferably differentially wound so that rheostatic step control of the generator output may be eliminated as the motor gains speed. By this means the desired generator output control is automatically effected as speed is gained.

When straight mechanical connection is had to the driving wheels it is desirable to charge the batteries used for lighting and other circuits (not herein shown). In order to do this, the conventional storage battery T is connected with the line 53 by means of a line 65. The other terminal of the battery T is connected to a terminal 66 of the pole 49 of switch Z by means of line 67. The said terminal is so arranged that when the switch Z is open primarily, then the battery circuit is closed. Hence under conditions of straight mechanical drive, when speeds are relatively high, the battery T receives a charge. Figs. 1 and 3 illustrate how an automatic cut-out CO may be placed in the battery line 65 for cutting the battery out at low speeds.

It will be seen that the circuit above described and illustrated in Figs. 1 and 3 has as one of its purposes the opening of electrical connections between the generator and motor when straight mechanical drive is used. In order to inherently and automatically balance the electro-motive-force of the generator against the counter electro-motive-force of the motor M when both of the machines are running at the same speed, the circuit of Figs. 2 and 4 is used.

The circuit illustrated in Figs. 2 and 4 is identical to the circuit illustrated in Figs. 1 and 3 except that the switch Z has been eliminated, as well as the battery charging circuit comprising the terminal 66, lines 65 and 67, and the battery T. The lines 31 and 59 extend directly to the exciter E without the interposition of lines 43 and 61 as required in the previously described form. The switch 29 serves only to break the load circuit manually for purposes of permitting the engine P to rotate at any speed without driving the motor, such as when it is desired not to move the vehicle. The conventional teaser field circuit for controlling exciter polarity at start is illustrated at TC in Figs. 3 and 4. In the case of the Fig. 3 circuit, the battery T may be used to energize this teaser field circuit, if desired.

Before setting forth the operations of the two forms of the drive, the details of the clutch C and reversing gear box R will now be described.

The clutch comprises a series of plates 64 slidably held to studs 70 of a driving plate 68 (Figs. 5 and 6). The plate 68 is fastened to the generator shaft 71. The plates 64 are properly faced with conventional clutch lining material. Fastened to the motor shaft 73 is a drum 75 with which is integrally formed a clamping plate 77. Splined to the drum 75 is a driven plate 79 and a clamping disc 81. Keyed to said drum is a spider 83 for pivotally supporting clutch-engaging dogs 85. The dogs 85 are made operative to clamp the clutch plates 64 and 79 together between the discs 77 and 81. This is done by way of links 87 operative from a conventional clutch yoke 89. It is evident from Fig. 5 and the above description, that upon movement of the yoke 89 to the left that the clutch is closed, and upon movement of said yoke to the right the clutch is opened. The pivoted lever 1 which carries the clutch fork for operating the yoke 89 is operated from said lever 5.

The reversing gear box R is illustrated in Figs. 7 and 8 and comprises a split case 91 in which is mounted a jack shaft 94 carrying reversing gears 93 and 95. The motor shaft 73 has permanently fastened thereto, within the said case 91, a gear 97, which gear 97 meshes permanently with the gear 93 on said jack shaft. The gear 97 has a crown connection 101 with a yoked portion 103 of a gear 105. The gear 105 is slidably splined to the propeller shaft stub 107. Shifter fork elements 109 serve to engage and disengage the crown connection between the gear 97 and gear 105, whereby uni-directional driving is permitted or prevented between the motor shaft 73 and the stub shaft 107. A pilot bearing 99 is interposed between the shafts 73 and 107. When the crown connection 101 is thrown open, then no driving connection exists between the shaft 73 and the shaft 107, that is, while a certain neutral position of the gear 105 is maintained. It may be seen that the shifter elements 109 are operable from a cross shaft 111 to which is fastened a shifting lever 113. When the lever 113 is thrown rearwardly (Figs. 2 and 7) the gear 105 is disengaged from the gear 97 and passes to a neutral position.

If the lever 113 is thrown farther back, then the said gear 105 is caused to engage an idler 115 which constantly meshes with the gear 95. The gear 95 is formed integrally on the same hub with the gear 93. Hence reverse movement may be had at the shaft 107 and at the rear wheels of the vehicle. The lever 113 is linked to an operating lever 119 by a drag link 121.

The operation of the Figs. 1 and 3 forms of the invention is as follows:

The engine P may be started in the usual manner by means of starting equipment (not shown). The switch 29 is preferably left open so that if it is needful to spin the motor at high rates for warming or the like, then the vehicle will not start. The lever 5 is thrown forward, whereby the clutch C is open and the switch Z closed.

When the engine P reaches an idling condition, the switch 29 may be closed. The car will not start because the electrical units are not designed to operate to move the vehicle at the low rates of current output involved when the engine P idles only. If needful, the conventional teaser circuit TC may be employed for properly polarizing the exciter E at the beginning of a running period.

To start the vehicle forward the controller K is set to its forward solid-line position (Figs. 1 and 3) and the engine P accelerated. The flow of energy from the generator then increases and passes to the motor M by way of the closed switch Z and the circuit above outlined. The motor M then rotates to drive the vehicle at a rate which is a function of the electrical energy input to the motor. This input is a function of the speed of the engine P. Hence the speed of the vehicle can be controlled from the engine P. If the required torque increases, then the engine speed may be kept at or increased to a point adapted for proper and economical operation of the internal combustion engine. This kind of operation, although relatively uneconomical, is ideal for starting purposes. The acceleration is smooth and takes place by infinite steps.

After the vehicle is under way the shift lever 5 is pulled rearwardly to the solid line position shown in Fig. 1. This opens the switch Z and closes the clutch C giving a direct mechanical drive. The main load circuit is opened, while the battery circuit is closed for charging from the exciter E. The result is that the generator and the motor are not in use for driving. Their relatively uneconomical operation is prevented while the highly efficient mechanical drive is used at the higher speeds of the vehicle. This last described operation represents normal operation which is effective for most of the running period. Hence great economy is effected.

For hard pulls at low speeds the electrical drive may again be put into operation merely by throwing the lever 5 forwardly again, whereby the load circuit is again closed and the clutch C opened for electrical driving.

If it is desired to reverse the motion of the vehicle the controller K may have its handle 25 set to the dotted line position. This reverses the effect of the motor fields as described, the motor reverses its direction of rotation, and the vehicle reverses. At reverse movement of the vehicle, the electrical circuit should not be broken at the switch Z and the clutch C closed, inasmuch as the machines G and M are rotating in opposite directions. For automotive work on road vehicles reverse movement is not used for long-run purposes, but merely for parking purposes and like operations lasting only a short period of time. Hence only the electrical drive need be used in reverse.

However, if it is desired to use this compound drive on rail cars and the like for shuttle runs, then the reverse gear box R of Fig. 2 might be employed with the Fig. 1 electrical circuit. The controller K would then be left in its forward solid-line position, and in order to reverse, the gear box R is thrown into a reversing position. Then by manipulating the lever 5, the same shifts from electrical to mechanical drive may be made in reverse as was the case for forward motion.

The operation of the Figs. 2 and 4 circuits are as follows:

The engine P is started as above described and the electrical circuit may be manually opened or closed at the switch 29. It is closed for running purposes.

For forward vehicle movement the lever 119 is left in its forward position, whence the reverse gear box is connected for forward operation. The controller K is left in a forward position. At standstill of the vehicle, the clutch C is left open by throwing the lever 5 forwardly. In order to accelerate the vehicle the engine P is accelerated, whence the vehicle moves under operation of the electrical drive. After speed has been gained the lever 5 is pulled back whereby the clutch is closed. This gives a direct mechanical drive through the gear box R, now set for forward movement. The motor and generator are automatically brought up to a common speed because of closure of the clutch, with the result that they are put into electrical balance or into a condition of low current flow if the generator is designed slightly larger than the motor. Hence economical running conditions are attained. For high torque operation the electrical drive may be employed at any time merely by opening the clutch. This involves the described speed drop between generator and motor.

For low speed reverse operation, such as for backing, parking and the like, the controller K may be thrown into reverse. As above stated, under these conditions, the clutch should not be closed.

For higher speed reverse operation, such as for shuttle service on rail cars and the like, the controller K is left in its forward position. Now in order to reverse, the gear box R is set from lever 119 for reverse movement. Then the electrical drive is first employed for rearward starting by opening the clutch C. The shift to mechanical drive is made by throwing the lever 5 so that the clutch closes. This causes electrical balance in the circuit and the vehicle moves rearwardly under economical conditions of energy application.

It should be understood from the above, that the mounting of the generator, clutch and motor may be made in numerous ways, such as for instance on separate drive systems to the rear axle or other axles. Furthermore, several motors M might be employed on different driving systems and the clutch interposed in one of them or mounted on a separate system. The applications of the basic principles can be multiplied. The wiring systems may also be changed.

In view of the above, it will be seen that the several objects of the invention are achieved and other advantageous results attained.

As many changes could be made in carryout the above constructions without departing from the scope of the invention, it is intended that all matter contained in the above description or shown in the accompanying drawings shall be interpreted as illustrative and not in a limiting sense.

I claim:

1. A vehicle drive comprising a prime mover, driving wheels for the vehicle, a generator driven by the prime mover, a motor adapted to receive energy from the generator and drive the vehicle, an electrical connecting circuit between the motor and generator for transferring said energy, a direct mechanical connection between the prime mover and the driving wheels, a clutch interposed in said mechanical connection, and means for closing the electrical circuit and opening said clutch at one operation, said means being adapted to also open the electrical circuit and close the clutch at one operation and means for throwing a battery charging circuit into connection upon closing the clutch.

2. A vehicle drive comprising a prime mover, driving wheels for the vehicle, a generator driven by the prime mover including an exciter circuit, a motor adapted to receive energy from the generator and drive the vehicle, an electrical connecting circuit between the motor and generator for transferring said energy, a mechanical connection between the prime mover and the driving wheels, a clutch interposed in said mechanical connection, and means for closing the electrical circuit and opening said clutch at one operation, said means being adapted to also open the electrical circuit and close the clutch at one operation, means for throwing a battery charging circuit into connection upon closing the clutch, means for opening said battery circuit upon opening the clutch, said means at the same time closing an exciter circuit.

3. A vehicle drive comprising a prime mover, at least one driving wheel for the vehicle, a generator driven by the prime mover, a motor adapted to receive energy from the generator and drive the vehicle, an electrical connecting circuit between the motor and generator for transferring said energy, a direct mechanical connection between the prime mover and at least one driving wheel, a clutch interposed in said mechanical connection, and means for closing the electrical circuit and opening said clutch at one operation, said means being adapted to also open the electrical circuit and close the clutch at one operation and means for throwing a battery charging circuit into connection upon closing the clutch.

In testimony whereof, I have signed my name to this specification this 6th day of February, 1926.

THORVALD JENSEN.